US010142059B2

(12) United States Patent
Vandenbaviere et al.

(10) Patent No.: US 10,142,059 B2
(45) Date of Patent: Nov. 27, 2018

(54) METHOD FOR VERIFYING THE INTEGRITY OF DATA TRANSMISSION BETWEEN A MAIN UPSTREAM UNIT AND A MAIN DOWNSTREAM UNIT

(71) Applicant: Safran Electronics & Defense, Boulogne-Billancourt (FR)

(72) Inventors: Yann Vandenbaviere, Boulogne-Billancourt (FR); Christophe Tuzi, Boulogne-Billancourt (FR); Olivier Gallay, Boulogne-Billancourt (FR); Sebastien Lhenoret, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 15/529,420

(22) PCT Filed: Nov. 26, 2015

(86) PCT No.: PCT/EP2015/077748
§ 371 (c)(1),
(2) Date: May 24, 2017

(87) PCT Pub. No.: WO2016/083494
PCT Pub. Date: Jun. 2, 2016

(65) Prior Publication Data
US 2017/0324515 A1 Nov. 9, 2017

(30) Foreign Application Priority Data
Nov. 27, 2014 (FR) ...................................... 14 61569

(51) Int. Cl.
*H04L 1/00* (2006.01)
*H04L 1/24* (2006.01)
(Continued)

(52) U.S. Cl.
CPC .......... *H04L 1/0061* (2013.01); *H04L 1/0041* (2013.01); *H04L 1/243* (2013.01);
(Continued)

(58) Field of Classification Search
CPC ..... H04L 1/0061; H04L 12/40; H04L 1/0041; H04L 1/243; H04L 12/4633; H04L 67/12; H04L 69/22; H04B 10/079; G06F 11/1004
See application file for complete search history.

(56) References Cited

U.S. PATENT DOCUMENTS 9,389,949 B1 * 7/2016 Campbell ........... G06F 11/1004
9,847,954 B2 * 12/2017 Lopez ..................... H04L 49/70
(Continued)

FOREIGN PATENT DOCUMENTS

WO WO-2014199070 12/2014

OTHER PUBLICATIONS

Sagem Defense Securite, "International Search Report," PCT/EP2015/077748, (dated Oct. 2, 2016).
(Continued)

*Primary Examiner* — Shelly A Chase
(74) *Attorney, Agent, or Firm* — Womble Bond Dickinson (US) LLP (57) ABSTRACT

A method for verifying the integrity of data transmission between a main upstream unit (10a) and a main downstream unit (20a). The method includes the implementation of the following steps: a data-processing module (11a) of the main upstream unit (10a) generates a first frame (T1) including a packet (P1) of data to be transmitted and a cyclic redundancy code (E1) of the packet (P1); encapsulates the first frame (T1) in a second frame (T2) which also includes a cyclic redundancy code (C1) of the first frame (T1); encapsulates the cyclic redundancy code (E1) of the packet (P1) in a third
(Continued)

frame (T3); the data-processing module (11b) of the at least one auxiliary upstream unit (10b) compares each of the cyclic redundancy codes (E1) extracted from the first frame (T1) with those extracted from the third frame (T3); and confirms the integrity of data transmission to the main downstream unit (20a) only if the comparison is positive.

13 Claims, 9 Drawing Sheets

(51) Int. Cl.
*H04L 12/46* (2006.01)
*H04L 12/40* (2006.01)
*H04L 29/06* (2006.01)
*H04L 29/08* (2006.01)

(52) U.S. Cl.
CPC .......... *H04L 12/40* (2013.01); *H04L 12/4633* (2013.01); *H04L 69/22* (2013.01); *H04L 67/12* (2013.01); *H04L 2012/4028* (2013.01)

(56) References Cited

U.S. PATENT DOCUMENTS

2007/0164166 A1 7/2007 Hirvonen
2016/0122003 A1 5/2016 Bara et al.

OTHER PUBLICATIONS

Sagem Defense Securite, "Search Report," FR Application No. 1461569, (dated Jul. 22, 2015) (with English Translation Cover Sheet).

\* cited by examiner

| FLAG [7E] | FRAME FORM. | ADDRESS | CTRL | DATA | FRAME CHECK SEQUENCE | FLAG [7E] | INTER FRAME |
|---|---|---|---|---|---|---|---|
| 1 byte | 1 byte | 2 bytes | 1 byte | n bytes | 2 (or 4) bytes | 1 byte | >15 bits |

Frame Form. and Address are Optional.

METHOD FOR VERIFYING THE INTEGRITY OF DATA TRANSMISSION BETWEEN A MAIN UPSTREAM UNIT AND A MAIN DOWNSTREAM UNIT

GENERAL TECHNICAL FIELD

The present invention relates to the electrical flight controls, and in particular a method for verifying the integrity of data transmission between a main upstream unit and main downstream unit.

STATE OF THE ART

Electrical flight controls are an advance on traditional mechanical flight controls.

The introduction of fast digital computers has allowed an additional step forward in the computerisation of flight controls whereby a pilot only needs to impose the overall movement of the aircraft and leaves the computer to control the necessary control surfaces as a function of altitude, speed, etc. Numerous "fly-by-wire" aircraft are currently in use, the control members of which are fully controlled by a computer.

Up until now, very few helicopters are piloted by electrical flight controls and none have electrical flight controls with an all-digital platform.

The propelling of a helicopter is effectively more complex than that of an aircraft. A helicopter is propelled by means of two rotors which ensure both lift and propulsion. Whereas on an aircraft these two functions are decoupled (allowing drive over a single axis), a helicopter is unable to move in a single direction but is always confronted with six degrees of freedom. Any change in the orientation of the blades of the rotors impacts drive, lift, drag, power and self-rotation, and the two rotors must offset the respective influences thereof.

For the development of said platform, whether based on a triplex or quadruplex architecture (for redundancy), communication links must be imagined between all the computing units of the system, with higher performance than is currently possible.

Since the application is highly critical ($10^{-10}$ integrity and $10^{-10}$ availability), these communication links must necessarily also be reliable, secure and able to withstand severe environments (lightning in particular).

In addition, in an avionics system (even more so for helicopters) weight is of prime importance, and in particular the weight of cabling. It is therefore important to obtain a maximum reduction in the number of external connections of each computer.

Finally, the volume of information and global performance requirements of the flight control system becoming increasingly greater, these communication links must offer high data flow rates and low latencies that are currently not on offer.

The most widely used data bus at present is the ARINC-429. However, it suffers from a certain number of defects: its bit rate is distinctly insufficient (100 kbits/s, whereas at least 15 Mbits/s are needed), and its environmental resilience (against lightening in particular) is poor. The 1553 bus has the same problems.

To overcome these difficulties, the AFDX architecture has been proposed (Avionics Full DupleX Switched Ethernet) which is a redundant Ethernet network with enhanced reliability. The bit rate, environmental resilience and reliability are acceptable, but it is particularly high-cost and it has much poorer latency than the ARINC-429.

It would be desirable to provide a data link that is reliable, secure, immune to severe environments (lightning and conducted susceptibility in particular), not requiring cabling redundancy, at a lower cost than a ARINC-429 link, with bit rates of at least 15 Mbit/s and latency lower than 50 µs, and that is compatible with commercially available test and development equipment.

PRESENTATION OF THE INVENTION

In a first aspect, the present invention therefore relates to a method for verifying the integrity of data transmission between a main upstream unit and main downstream unit, the method being characterized in that it comprises implementing steps of:
(a) Generation, by a data processing module of the main upstream unit, of a first frame comprising a data packet to be transmitted and a cyclic redundancy code of said packet, and transmission to an interface module of the main upstream unit;
(b) Encapsulation, by said interface module of the main upstream unit, of the first frame in a second frame also including a cyclic redundancy code of the first frame;
(c) Transmission of the second frame to interface modules of the main downstream unit and of at least one auxiliary upstream unit;
(d) Extraction of the first frame from the second frame by the interface modules of the main downstream unit and of the at least one auxiliary upstream unit; and transmission to data processing modules of the main downstream unit and of the at least one auxiliary upstream unit;
(e) Extraction of the packet from the first frame by the data processing module of the main downstream unit; and extraction of the cyclic redundancy code of the packet by the data processing module of the at least one auxiliary upstream unit;
(f) Encapsulation, by said interface module of the main upstream unit, of the cyclic redundancy code of the packet in a third frame;
(g) Transmission of the third frame to the interface module of the at least one auxiliary upstream unit;
(h) Extraction of the cyclic redundancy code of the packet from the third frame by the interface module of the at least one auxiliary upstream unit; and transmission to the data processing module of the at least one auxiliary upstream unit;
(i) Comparison, by the data processing module of the at least one auxiliary upstream unit, of each cyclic redundancy code extracted from the first frame and from the third frame; and confirmation of the integrity of data transmission to the main downstream unit only if comparison is positive.

According to other advantageous, non-limiting characteristics:
step (c) also comprises the transmission of the second frame to the interface module of at least one auxiliary downstream unit; step (d) comprises the extraction of the first frame from the second frame by the interface module of the at least one auxiliary downstream unit, and transmission to a data processing module of the at least one auxiliary downstream unit; and step (e) comprises extraction of the packet from the first frame by the data processing module of the at least one auxiliary downstream unit;

the method comprises an additional step (j) to transmit the packet extracted by the data processing module of the at least one auxiliary downstream unit to the data processing module of the main downstream unit; comparison, by the data processing module of the main downstream unit, of each of the received packets, and confirmation of the integrity of data transmission to the main downstream unit only if comparison is positive;

the packet to be transmitted is a first packet generated by the data processing module of the main upstream unit from control data, step (e) comprising extraction of the packet from the first frame by the data processing module of the at least one auxiliary upstream unit; and the method further comprising the generation, by the data processing module of the at least one auxiliary upstream unit, of a second packet from the same control data as the first packet; comparison by the data processing module of the at least one auxiliary upstream unit of the first packet and second packet; and confirmation of the integrity of data transmission to the main downstream unit only if comparison is positive;

the method comprises implementing steps of:
- (α) Generation, by the data processing module of the at least one auxiliary upstream unit, of a fourth frame comprising the second packet and a cyclic redundancy code of said second packet, and transmission to the interface module of the at least one auxiliary upstream unit;
- (β) Encapsulation, by said interface module of the at least one auxiliary upstream unit, of the fourth frame in a fifth frame also including a cyclic redundancy code of the fourth frame;
- (γ) Transmission of the fifth frame to the interface module of the main upstream unit;
- (δ) Extraction of the fourth frame from the fifth frame by the interface module of the main upstream unit, and transmission to the data processing module of the main upstream unit;
- (ε) Extraction of the second packet from the fourth frame by the data processing module of the main upstream unit;
- (ζ) Comparison, by the data processing module of the main upstream unit, of the first packet and second packet; and confirmation of the integrity of data transmission to the main downstream unit only if comparison is positive.

the second and third frames conform to the High-Level Data Link Control standard;

the upstream units and the downstream units are physically connected via a single wire link;

said wire link conforms to standard RS-485.

In a second aspect, the invention relates to a flight computer comprising a main upstream unit, a main downstream unit and at least one auxiliary upstream unit, the units being configured to implement the method according to the first aspect.

In a third aspect, the invention proposes an aircraft flight control system, comprising at least three computers according to the second aspect, the upstream units of the computers receiving flight control data from at least one aircraft piloting component, and the downstream units of the computers giving control instructions to at least one actuator of the aircraft.

According to other advantageous, non-limiting characteristics:
each upstream unit of a computer is connected to the downstream units of the other computers.

In fourth and fifth aspects, the invention relates to a computer program product comprising code instructions to execute a method according to the first aspect of the invention for verifying the integrity of data transmission between a main upstream unit and main downstream unit; and storage means readable by computer equipment in which a computer program product comprises code instructions to execute a method according to the first aspect of the invention for verifying the integrity of data transmission between a main upstream unit and main downstream unit.

PRESENTATION OF THE FIGURES

Other characteristics and advantages of the present invention will become apparent on reading the following description of a preferred embodiment. This description is given with reference to the appended drawings in which.

DETAILED DESCRIPTION

Architecture

ARINC-429, previously mentioned, is a standard describing an architecture, an electrical interface and a protocol for the conveying of digital data. It is based on a "simplex" link, i.e. a one-way link 1-to-N that is trebled or quadrupled (to obtain "triplex" or "quadruplex" architectures). Therefore, even if N−1 links should fail, the system would function.

The present method sets out to use physical interfaces and protocols other than those of ARINC-429 in simple and sufficiently secure manner, whilst maintaining its topology, so as to keep to the advantages of ARINC-429 whilst improving the performance thereof, in particular in terms of bit rate, latency and environmental resilience.

Figure 1:
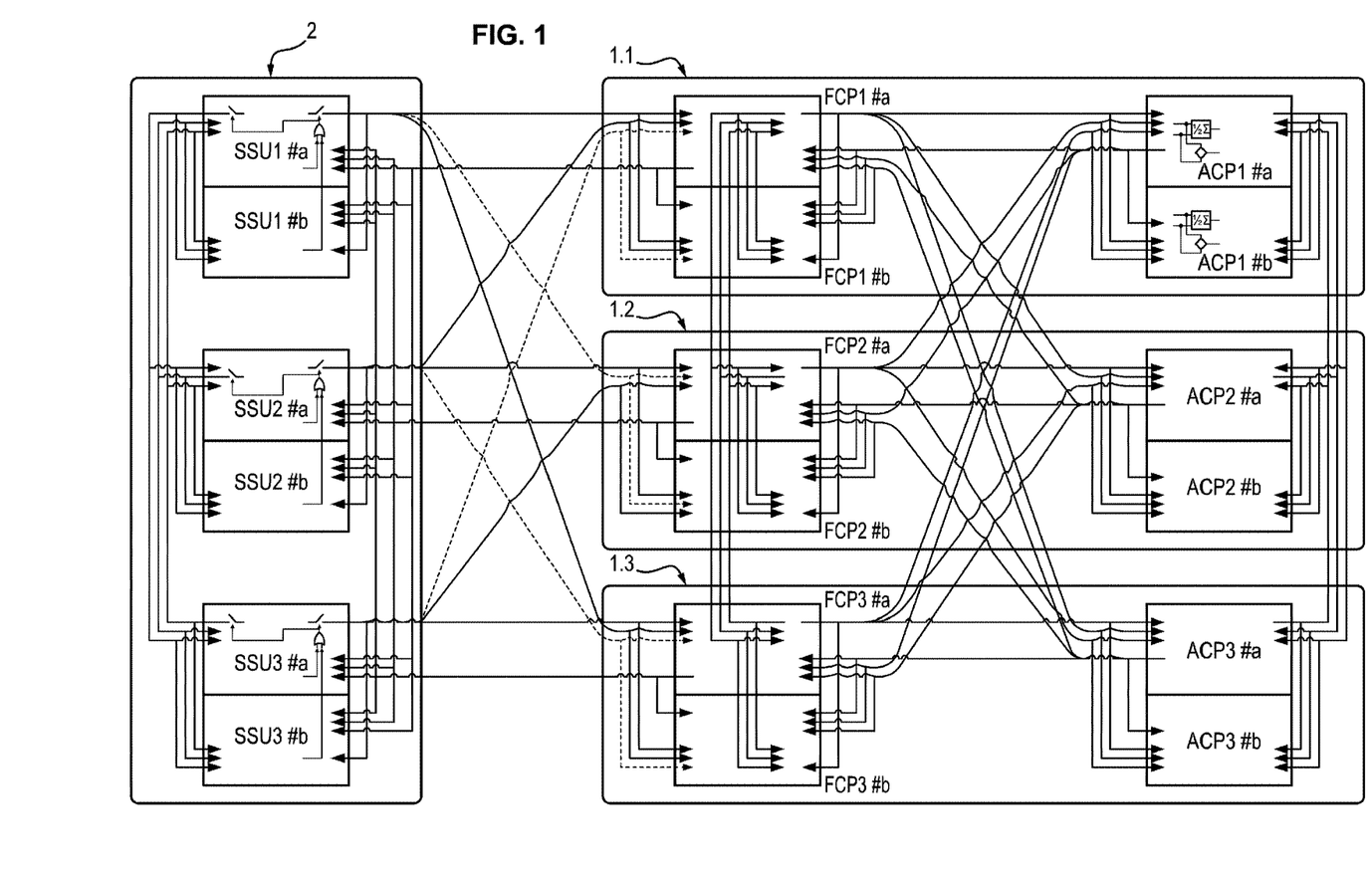
FIG. 1 illustrates an architecture of a flight control system in which the method of the invention is implemented.

With reference to FIG. 1, the present method is implemented in a system of FCS type (Flight Control System) of an aircraft (in particular a helicopter) comprising one or more (redundant) computers 1 (Flight Control Computer—FCC). Each computer can be considered to be a transmission "line" of the pilot's flight controls to the aerodynamic control surfaces i.e. the various elements of the aircraft which allow modification of its flight path, driven by actuators. The pilot acts on the piloting components (e.g. cyclic stick) generating flight control data that are injected by a module 2 (Side Stick Unit—SSU, this stick being used to actuate the aircraft's control surfaces) into the lines 1.

FIG. 1 particularly illustrates a triplex architecture with a first line 1.1, a second line 1.2 and a third line 1.3. The lines are identical.

By "line" is meant an independent group of a plurality of interconnected units 10, 20 including at least one "upstream" unit 10 (Flight Control Processor—FCP) and at least one "downstream" unit 20 (Actuator Control Processor—ACP).

Each upstream unit 10 receives an input of flight control data (translating the global movement of the aircraft desired by the pilot) and generates flight control instructions (translating the actions to be carried out by the aircraft actuating members) which transit through the aircraft. Each downstream unit 20 (distant, located at the actuators) receives these flight control data and generates actuator control instructions to obtain active movement of the flight control surfaces (e.g. increased incidence of the anti-torque rotor blades if the pilot wishes to modify the orientation of the helicopter).

Within one line, the units 10, 20 are duplicated following COM/MON architecture ("COMmand, MONitoring"). In particular, there is a main upstream unit 10a and at least one auxiliary upstream unit 10b. Similarly, (as illustrated in FIG. 1 et seq.) there is a main downstream unit 20a and at least one auxiliary downstream unit 20b. The main units 10a, 20a are master units, whereas the auxiliary units 10b, 20b receive copies of data received by the main units 10a, 20a and are used solely to monitor and verify the data given by the main units 10a, 20a.

Each unit 10a, 10b, 20a, 20b comprises a data processing module 11a, 11b, 21a, 21b (typically a processor performing data processing) and an interface module 12a, 12b, 22a, 22b (typically a Field-Programmable Gate Array—FPGA, which manages communications with the other units). The two modules can be connected via a local communication link.

In the remainder of the present description, the example will be taken of a line 1 having four units 10a, 10b, 20a, 20b: one main upstream unit 10a, one auxiliary upstream unit 10b, one main downstream unit 20a, and an auxiliary downstream unit 20b. As can be seen, the lines 1 are specific in that a single physical link (single cabling) connects the upstream units 10 to the downstream units 20, thereby allowing a substantial reduction in weight and cost. Despite this single cabling, the present method allows guaranteed integrity of data transmission within a line 1. In other words, it is possible with an error rate of less than $10^{-10}$ to guarantee that the data transmitted from the main upstream unit 10a to the main downstream unit 20a are valid.

It is to be noted, as illustrated in FIG. 1, that it remains possible to provide cross-cabling from one line 1.1, 1.2, 1.3 to another (to allow uninterrupted operation of each line 1 even if the cabling inherent in a line is physically damaged e.g. by gunshots if the aircraft is a military aircraft). Even with these cross-cablings the number of physical links to be provided remains much lower than in the prior art.

The physical interfaces (hardware) within a line 1 preferably conform to standard RS-485 (for which bit rate can reach several Mbits/s), and are advantageously equipped with galvanic insulations for full resistance to lightning and electromagnetic events (and hence excellent environmental resilience). Although RS-485 is not dedicated to electrical flight controls, the present method allows guaranteed full reliability.

Verification of the Integrity of Data Transmission

With the present invention, it can be ensured that a packet P1 produced by the data processing module 11a of the main upstream unit 10a is transmitted identically to the data processing module 21a of the main downstream unit 20a. This aspect of the method, now to be described, assumes that the packet P1 is correctly generated by the data processing module 11a (from flight control data). However, as explained below, in one optional embodiment the method comprises verification of the integrity of the data generated by the data processing module 11a (and hence of packet P1).

Figure 2:
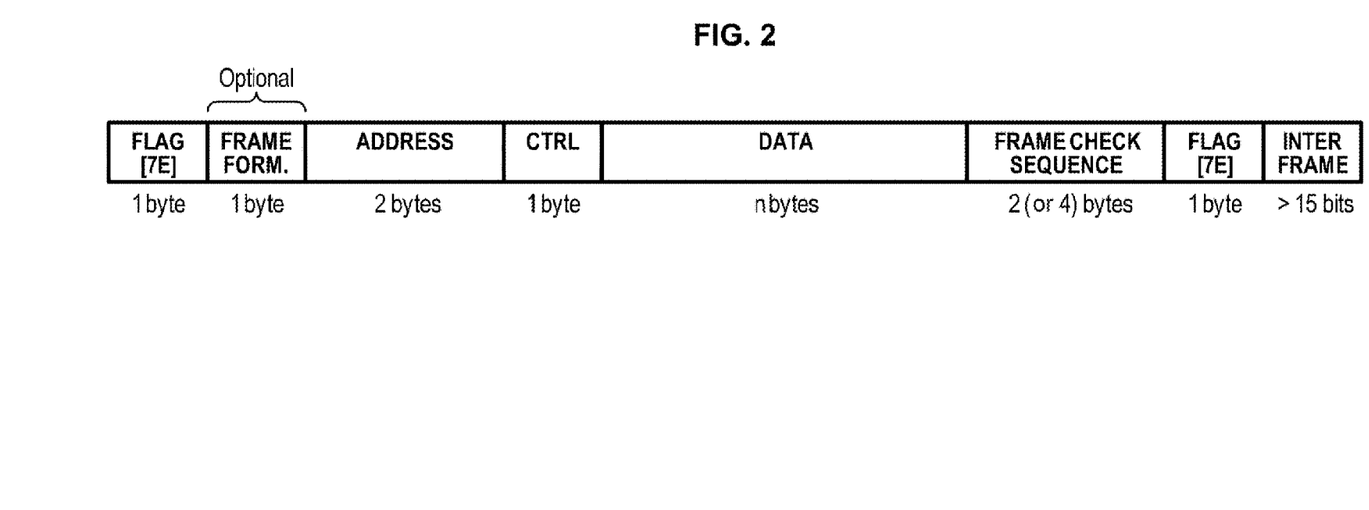
FIG. 2 is a schematic of an example of an HDLC frame used by the method of the invention.

The protocol used for data transmission (between downstream 10 and upstream 20 units, i.e. between interface modules 12, 22—it is to be noted that any format can be used for transmissions between the processing module and the interface module within one same unit) advantageously conforms to standard HDLC ("High-Level Data Link Control", standard ISO/IEC 13239:2002). The unit used is a Frame having a structure such as can be seen in FIG. 2. Each frame is delimited by two identical flags and comprises a data field of 20 to 32 octets. The address field is used as message identifier on 2 octets and is equivalent to the ARINC-429 label. The control field of 1 octet is not used. Between two frames there are at least 15 bits having a value of "1". The frames concerned by the present method are the second frame T2 and third frame T3, and optional fifth frame T5.

Figure 3A:
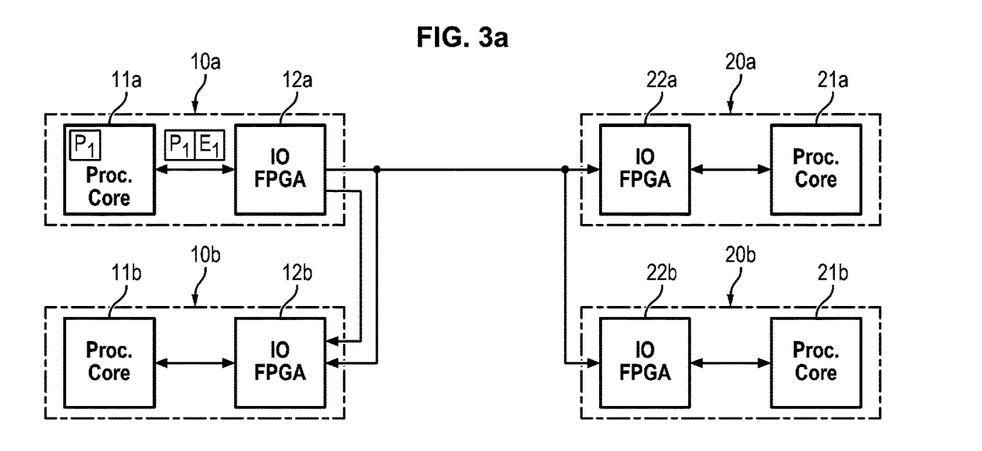
FIGS. 3a-h illustrate the steps of an aspect for verification of the integrity of data transmission, in one preferred embodiment of the method of the invention.

The method starts with step (a) illustrated in FIG. 3a for the generation, by the data processing module 11a of the main upstream unit 10a, of a first frame T1 (in any format) comprising a packet P1 of data to be transmitted and a cyclic redundancy code E1 of said packet P1. This gives T1=P1+E1. The cyclic redundancy code E1 (commonly known as a "checksum") of the packet P1 is obtained by a Cyclic Redundancy Check (CRC), particularly by means of a known hashing method. It is within the reach of persons skilled in the art to apply a CRC-16-CCITT on 2 octets. This frame T1 is transmitted in particular via a local communication link to the interface module 12a of the main upstream unit 10a.

Figure 3B:
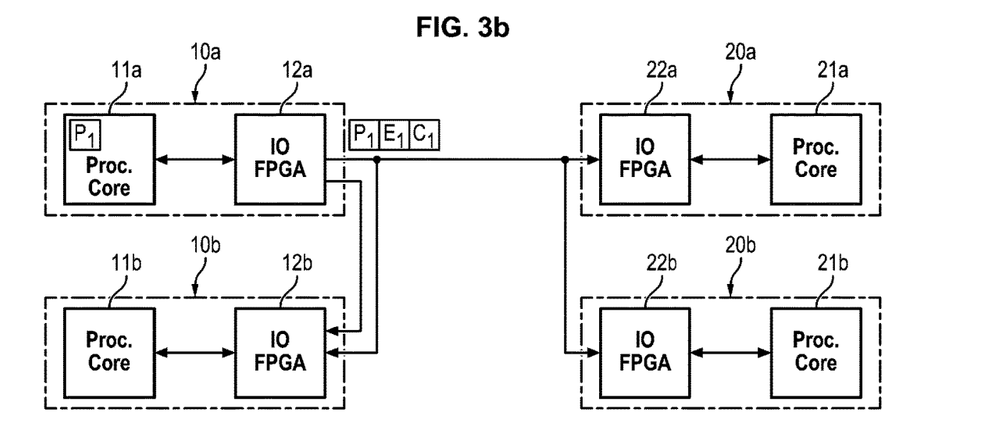

At step (b) illustrated in FIG. 3b, this interface module 12a encapsulates the first frame T1 in a second frame T2 (which this time advantageously conforms to the previously described format in FIG. 2) also including a cyclic redundancy code C1 of the first frame T1. In other words, the data field of the second frame T2 is composed of packet P1 and the associated CRC E1. The CRC C1 may be of same type as the CRC E1, or a CRC-32-IEEE on 4 octets for example.

Figure 3C:
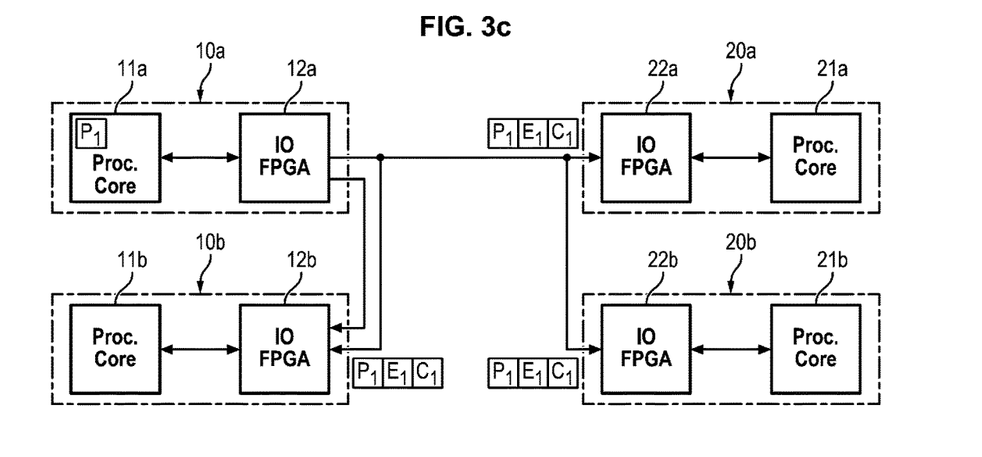

At step (c) illustrated in FIG. 3c, the second frame T2 is transmitted (via the cabling) at least to the interface module 22a of the main downstream unit 20a and to the interface module 12b of the auxiliary upstream unit 10b. In the event of the presence of at least one auxiliary downstream unit 20b (as in the example), the second frame T2 is also transmitted to the interface module 22b thereof.

Each interface module 22a, 22b, 12b, at step d), extracts the first frame T1 from the second frame T2 (by isolating the frame identifier and CRC C1) and transmits this frame to the associated data processing modules 21a, 21b, 11b.

Figure 3D:
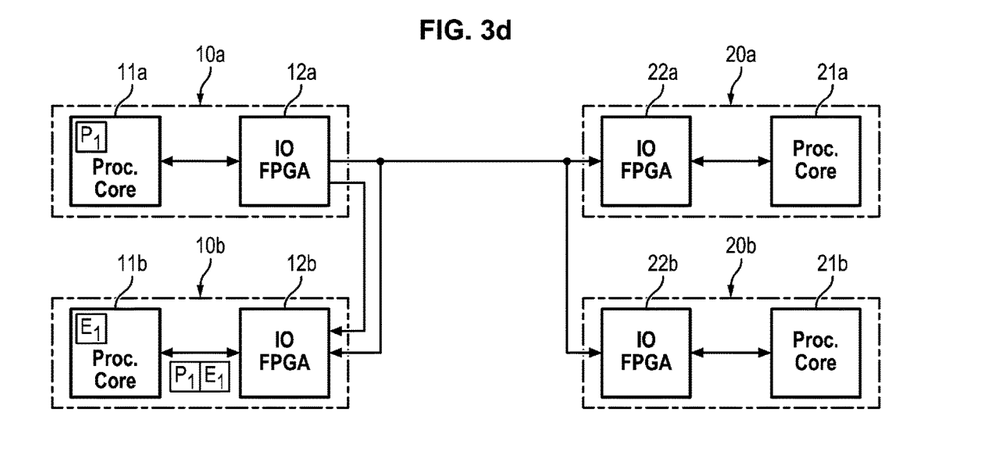
Figure 3E:
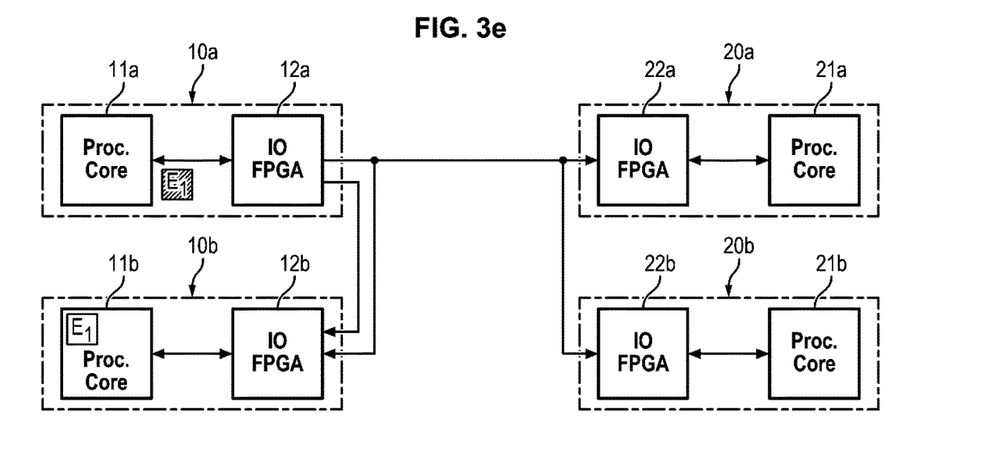

The data processing module 11b of the auxiliary upstream unit 10b, at step e) illustrated in FIG. 3d, extracts the cyclic redundancy code E1 of packet P1, while the data processing module 21a of the main downstream unit 20a (and when applicable the data processing module 21b of the auxiliary downstream unit 20b) extracts the packet P1 from the first frame T1. It will be noticed that, paradoxically, the data processing module 11b of the auxiliary upstream unit 10b may ignore packet P1 and solely take into consideration the cyclic redundancy code E1 of packet P1 (contrary to functioning on the downstream side) since, as will be seen, this will enable the auxiliary upstream unit 10b to implement the transmission integrity test. The predicate is that, insofar as the cabling is single cabling, if the auxiliary upstream unit 10b has correctly received the cyclic redundancy code E1 of packet P1, it can then be assumed that this is also case for packet P1 since the CRC is an imprint of P1, this applying to all recipients. If an error occurs at the time of transmission (at the interface module 12a) or before (at the data processing module 11a), then all transmissions of E1 will be erroneous. However, additional tests will be implemented in embodiments that are described below. At this stage, illustrated in FIG. 3e, each of the upstream data processing modules 11a, 11b has a version of CRC E1.

Figure 3F:
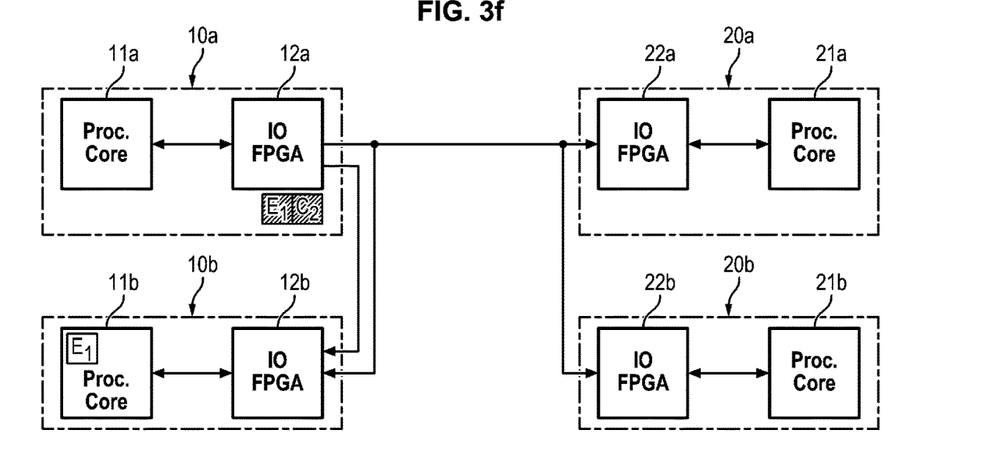

Therefore, at step (f) illustrated in FIG. 3f, the interface module 12a of the main upstream unit 10a this time encapsulates the cyclic redundancy code E1 of packet P1 (that it receives from the data processing module 11a) in a third frame T3. In other words, the data field of frame T3 does not contain P1 (and in practice only contains E1). This third frame also comprises a cyclic redundancy code C1' of the cyclic redundancy code E1 of packet P1 (similar to CRC C1). It is to be noted that CRC C1 and C1' differ since the hashed data are not the same.

Figure 3G:
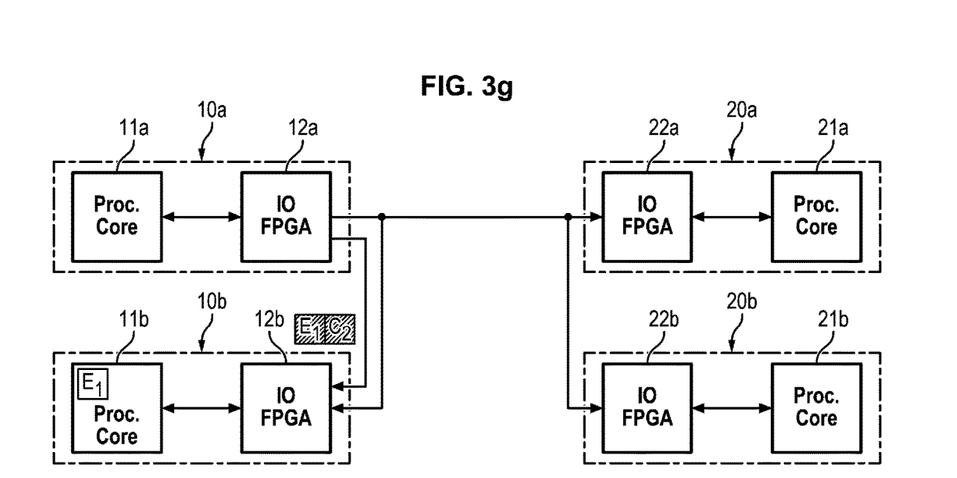

At step (g) illustrated in FIG. 3g, the third frame T3 is transmitted (via the cabling) to the interface module 12b of the auxiliary upstream unit 10b (the downstream units 20a, 20b are not recipients thereof).

Similar to functioning at step (d), the interface module 12b at step (h) extracts the CRC E1 from the third frame T3 (by isolating the frame identifier and CRC C1') and transmits the same to the associated data processing module 11b.

Figure 3H:
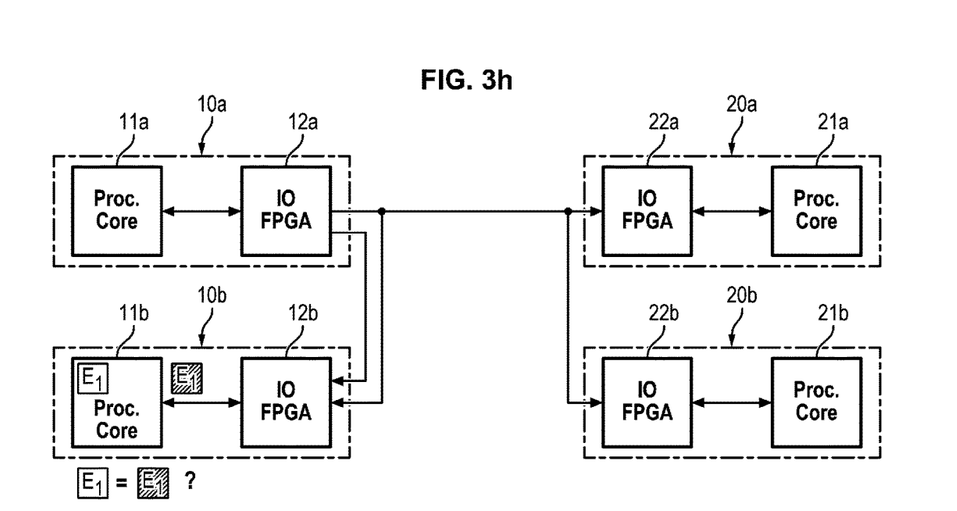

The latter then has two versions of CRC E1 (the one extracted from the first frame T1 and the one extracted from the third frame T3) and can compare these (bit by bit) at step (i) illustrated in FIG. 3h. The integrity of data transmission to the main downstream unit 20a is confirmed only if comparison is positive, in other words, both E1s are identical, a sign that each of the transmissions of the second and third frames T2, T3 has been properly conducted (otherwise at least one of the two CRCs would be different). At this stage, the data processing module 21a of the main downstream unit 20a can be sure that the transmission of packet P1 is error-free.

It is to be noted that if there is at least one auxiliary downstream unit 20b, the method may comprise an additional step (j) to transmit the packet P1 extracted by the data processing module 21b of the auxiliary downstream unit 20b to the data processing module 21a of the main downstream unit 20a. As in step (i), a comparison is made by the data processing module 11b of the at least one auxiliary upstream unit 10b between each of the received packets P1, the integrity of data transmission to the main downstream unit 20a being confirmed only if the comparison is positive, in other words both P1s are identical, a sign that each of the "downstream" de-encapsulations of the second frame T2 has been properly conducted (otherwise at least one the two P1s would be different).

Verification of the Integrity of Generated Data

The previously described steps give assurance that a packet P1 has been properly transmitted, but not that this packet P1 is correct. According to one preferred embodiment the method comprises (single or double) verification steps to verify the integrity of data generated by the data processing module 11a of the main upstream unit 10a (from control data).

Figure 4A:
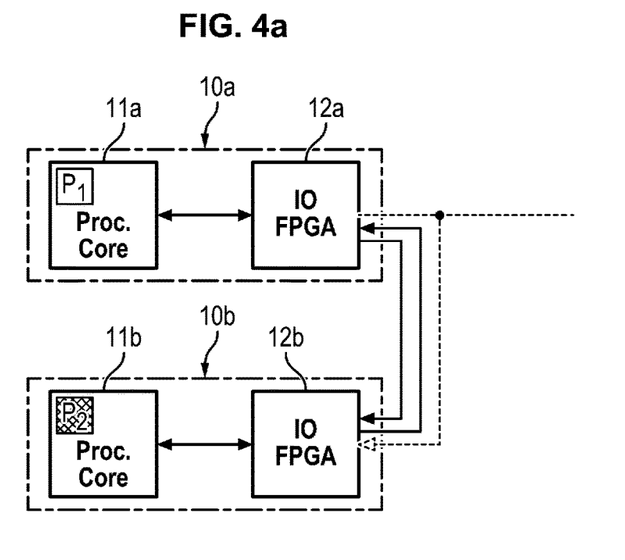
FIGS. 4a-f illustrate the steps of an aspect for verification of the integrity of generated data, in one preferred embodiment of the method of the invention.

For this purpose, the packet P1 to be transmitted is designated as a first packet which will be compared with a monitoring packet P2. The method then comprises the generation of the second packet P2, by the data processing module 11b of the auxiliary upstream unit 10b, from the same control data as for the first packet P1, as can be seen in FIG. 4a.

According to a single verification step (e), previously mentioned, comprises the extraction of packet P1 from the first frame T1 by the data processing module 21a of the at least one auxiliary upstream unit 10b (it is recalled that the fact was previously described that at step (e) the CRC E1 of packet P1 is extracted).

A new comparison this time between the first packet P1 and second packet P2, can be performed by the data processing module 11b of the auxiliary upstream unit 10b. The integrity of data transmission to the main downstream unit 20a is then confirmed only if the comparison is positive, i.e. P1 and P2 are identical, translating the fact that the transmitted packet P1 is correct.

In one preferred embodiment, the method comprises additional steps illustrated in the Figures, to carry out twofold verification of packet P1. The steps that are now going to be described can be performed before steps (a)-(i) mentioned above, or concomitantly therewith. It is to be noted that packet P1 can be generated twice, so as once to verify the integrity of data generation and a second time to verify the integrity of data transmission. Preferably, the two tests are imbricated to save time.

Figure 4B:
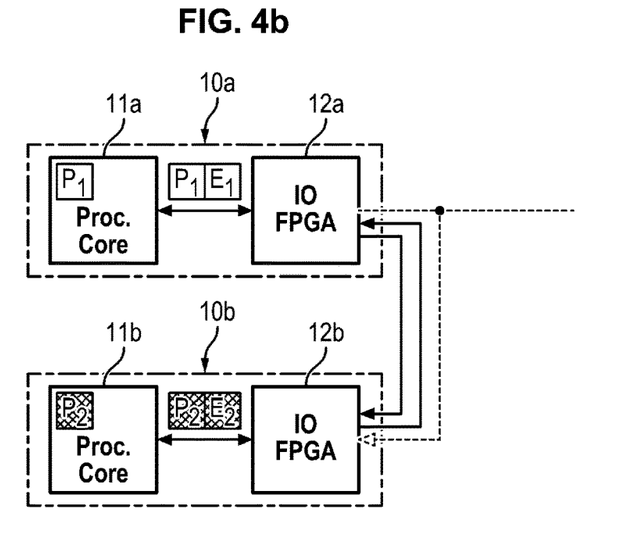

At step ($\alpha$) (which may be simultaneous with step (a), with which it is similar), illustrated in FIG. 4b, there is generated by the data processing module 11b of the auxiliary upstream 10b a fourth frame T4 comprising the second packet P2 and a cyclic redundancy code E2 of said second packet P2. This gives T4=P2+E2. This frame T4 (which must normally be identical to the first frame T1) is transmitted to the interface module 12b of the auxiliary upstream unit 10b.

Figure 4C:
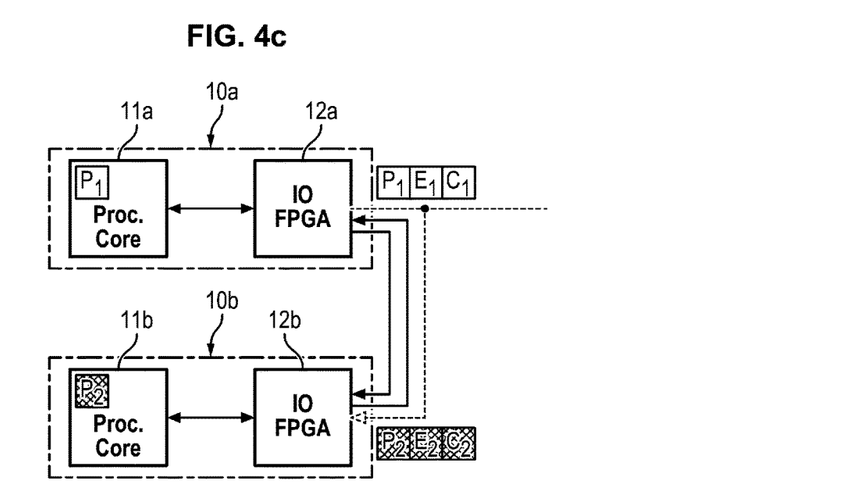

At step ($\beta$) (which may be simultaneous with step (b), with which it is similar) illustrated in FIG. 4c, this interface module 12b encapsulates the fourth frame T4 in a fifth frame T5 (which again advantageously conforms to the previously described format in FIG. 2 also including a cyclic redundancy code C2 of the fourth frame T4. In other words, the data field of the fifth frame T5 is composed of packet P2 and the associated CRC E2, and this fifth frame T5 must normally be identical to the second frame T2.

Figure 4D:
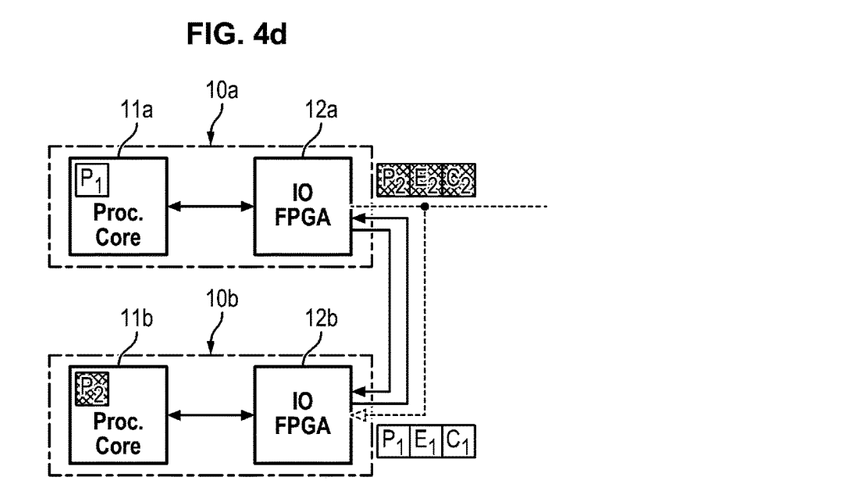

At step ($\gamma$) (which may be simultaneous with step (c), with which it is similar) illustrated in FIG. 4d, the fifth frame T5 is transmitted (either via the same cabling, or via a direct link since all the upstream modules 10 are arranged in vicinity of one another) to the interface module 12a of the main upstream unit 10a.

The interface module 12a at step ($\delta$) (which may be simultaneous with step (d), with which it is similar) extracts the fourth frame T4 from the fifth frame T5 (by isolating the frame identifier and CRC C2) and transmits this frame to the associated data processing module 11a.

Figure 4E:
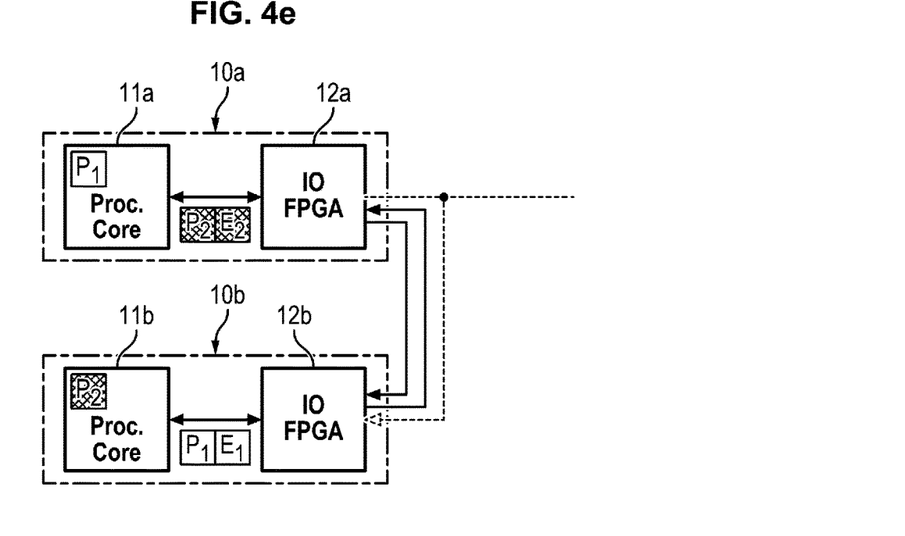

The data processing module 11a of the main upstream unit 10a at step ($\epsilon$) (which may be simultaneous with step (e), with which it is similar), illustrated in FIG. 4e, then extracts the second packet P2 from the fourth frame T4.

Figure 4F:
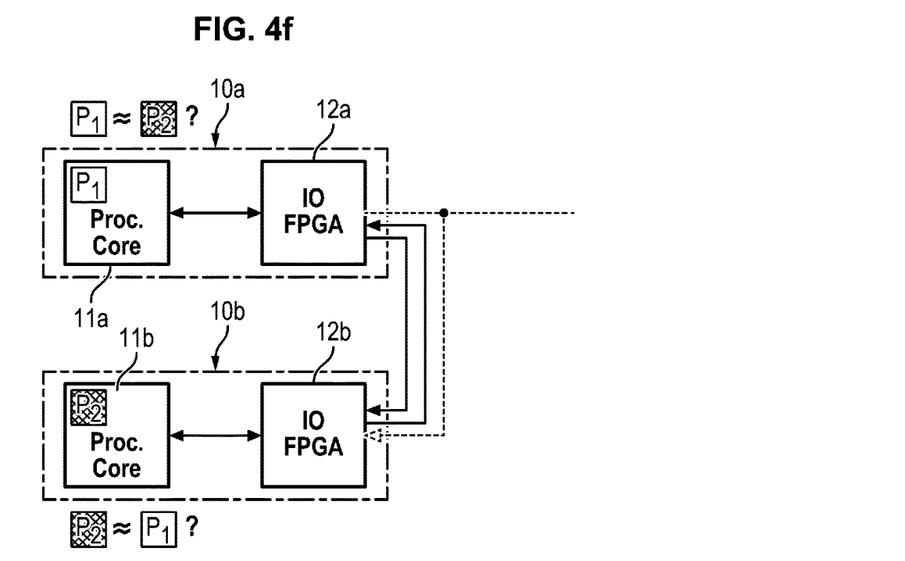

This module then has two versions of the packet to be transmitted (the first packet P1 extracted from the first frame T1 and its copy P2 extracted from the fourth frame T4) and can compare these at step g) (which may be simultaneous with comparison at the data processing module 11b of the auxiliary upstream unit 10b, previously mentioned, with which it is similar) illustrated in FIG. 4f. The integrity of data transmission to the auxiliary upstream unit 10b is confirmed only if the comparison is positive, in other words packet P1 and packet P2 are identical, a sign that the generation of each of these packets (from the same data) has been properly carried out. At this stage, the data processing module 11a of the main upstream unit 10a can be sure that packet P1 has been generated (and consequently transmitted) free of error.

FCC Computer and FCS System

In a second aspect, the invention relates to a flight computer 1 of FCC type, in other words a "line" comprising a main upstream unit 10a, a main downstream unit 20a and at least one auxiliary upstream unit 10b (and advantageously at least one auxiliary downstream unit 20b), the units being configured to implement the method according to the first aspect.

The units 10a, 10b, 20a, 20b of one same line 1, as explained, are physically connected via a single wire link, in particular a wire link conforming to standard RS-485.

In a third aspect, the invention relates to a flight control system (of FCS type) of an aircraft (a helicopter in particular), comprising at least three computers 1.1, 1.2, 1.3 according to the second aspect, so as to obtain an architecture of the type shown in FIG. 1.

The upstream units 10a, 10b of computers 1.1, 1.2, 1.3 receive flight control data from at least one piloting component of the aircraft (cyclic stick, pedals, etc.), and the downstream units 20a, 20b of the computers 1.1, 1.2, 1.3 give control instructions to at least one actuator of the aircraft (cylinders actuating the control surfaces etc.). Preferably, each upstream unit 10a, 10b of a computer 1.1, 1.2, 1.3 is connected to the downstream units 20a, 20b of the other computers 1.1, 1.2, 1.3 and/or all the upstream units 10a, 10b of the computers 1.1, 1.2, 1.3 (respectively all the downstream units 20a, 20b of the computers 1.1, 1.2, 1.3) are connected together.

The aircraft therefore comprises the flight control system, piloting components and actuators.

Computer Program Product

In third and fourth aspects, the invention relates to a computer program product comprising code instructions for the execution (in particular on the data processing means 11a, 11b, 21a, 21b of the units) of the method for verifying the integrity of data transmission between a main upstream unit 10a and main downstream unit 20a, and storage means readable by computer equipment (in particular a memory of the units) containing this computer program product.

The invention claimed is:

1. Method for verifying the integrity of data transmission between a main upstream unit and a main downstream unit, the method being characterized in that it comprises implementing the steps of:
   (a) Generation, by a data processing module of the main upstream unit, of a first frame comprising a data packet to be transmitted and a cyclic redundancy code of said packet, and transmission to an interface module of the main upstream unit;
   (b) Encapsulation, by said interface module of the main upstream unit, of the first frame in a second frame also including a cyclic redundancy code of the first frame;
   (c) Transmission of the second frame to interface modules of the main downstream unit and of at least one auxiliary upstream unit;
   (d) Extraction of the first frame from the second frame by the interface modules of the main downstream unit and of the at least one auxiliary upstream unit; and transmission to data processing modules of the main downstream unit and of the at least one auxiliary upstream unit;
   (e) Extraction of the packet from the first frame by the data processing module of the main downstream unit; and extraction of the cyclic redundancy code of packet by the data processing module of the at least one auxiliary upstream unit;
   (f) Encapsulation, by said interface module of the main upstream unit, of the cyclic redundancy code of packet in a third frame;
   (g) Transmission of the third frame to the interface module of the at least one auxiliary upstream unit;
   (h) Extraction of the cyclic redundancy code of packet from the third frame by the interface module of the at least one auxiliary upstream unit; and transmission to the data processing module of the at least one auxiliary upstream unit;
   (i) Comparison by the data processing module of the at least one auxiliary upstream unit of each of the cyclic redundancy codes extracted from the first frame and from the third frame; and confirmation of the integrity of data transmission to the main downstream unit only if comparison is positive.

2. The method according to claim 1, wherein step also comprises the transmission of the second frame to the interface module of at least one auxiliary downstream unit; step comprises extraction of the first frame from the second frame by the interface module of the at least one auxiliary downstream unit and transmission to a data processing module of the at least one auxiliary downstream unit; and step comprises extraction of packet from the first frame by the data processing module of the at least one auxiliary downstream unit.

3. The method according to claim 2, comprising an additional step to transmit packet, extracted by the data processing module of the at least one auxiliary downstream unit, to the data processing module of the main downstream unit; comparison, by the data processing module of the main downstream unit, of each of received packets, and confirmation of the integrity of data transmission to the main downstream unit only if comparison is positive.

4. The method according to claim 1, wherein the packet to be transmitted is a first packet generated from control data by the data processing module of the main upstream unit, step comprising extraction of packet from the first frame by the data processing module of the at least one auxiliary upstream unit; and the method further comprising the generation by the data processing module of the at least one auxiliary upstream unit of a second packet from the same control data as the first packet; comparison, by the data processing module of the at least one auxiliary upstream unit, of the first packet and second packet; and confirmation of the integrity of data transmission to the main downstream unit only if comparison is positive.

5. The method according to claim 1, comprising the implementing of steps of:
   (α) Generation, by the data processing module of the at least one auxiliary upstream unit of a fourth frame comprising the second packet and a cyclic redundancy code of said second packet, and transmission to the interface module of the at least one auxiliary upstream unit;
   (β) Encapsulation, by said interface module of the at least one auxiliary upstream unit, of the fourth frame in a fifth frame also including a cyclic redundancy code of the fourth frame;
   (γ) Transmission of the fifth frame to the interface module of the main upstream unit;

(δ) Extraction of the fourth frame from the fifth frame by the interface module of the main upstream unit, and transmission to the data processing module of the main upstream unit;
(ε) Extraction of the second packet from the fourth frame by the data processing module of the main upstream unit;
(ζ) Comparison, by the data processing module of the main upstream unit, of the first packet and second packet; and confirmation of the integrity of data transmission to the main downstream unit only if comparison is positive.

6. The method according to claim 1, wherein the second and third frames conform to the HighLevel Data Link Control standard.

7. The method according to claim 1, wherein the upstream units and downstream units are physically connected via a single wire link.

8. The method according to claim 7, wherein said wire link conforms to standard RS-485.

9. A flight computer comprising a main upstream unit, a main downstream unit and at least one auxiliary upstream unit, the units being configured to implement steps of:
(a) Generation, by a data processing module of the main upstream unit, of a first frame comprising a data packet to be transmitted and a cyclic redundancy code of said packet, and transmission to an interface module of the main upstream unit;
(b) Encapsulation, by said interface module of the main upstream unit, of the first frame in a second frame also including a cyclic redundancy code of the first frame;
(c) Transmission of the second frame to interface modules of the main downstream unit and of at least one auxiliary upstream unit;
(d) Extraction of the first frame from the second frame by the interface modules of the main downstream unit and of the at least one auxiliary upstream unit; and transmission to data processing modules of the main downstream unit and of the at least one auxiliary upstream unit;
(e) Extraction of the packet from the first frame by the data processing module of the main downstream unit; and extraction of the cyclic redundancy code of packet by the data processing module of the at least one auxiliary upstream unit;
(f) Encapsulation, by said interface module of the main upstream unit, of the cyclic redundancy code of packet in a third frame;
(g) Transmission of the third frame to the interface module of the at least one auxiliary upstream unit;
(h) Extraction of the cyclic redundancy code of packet from the third frame by the interface module of the at least one auxiliary upstream unit; and transmission to the data processing module of the at least one auxiliary upstream unit;
(i) Comparison by the data processing module of the at least one auxiliary upstream unit of each of the cyclic redundancy codes extracted from the first frame and from the third frame; and confirmation of the integrity of data transmission to the main downstream unit only if comparison is positive.

10. An aircraft flight control system comprising at least three computers according to claim 9, the upstream units of the computer receiving flight control data from at least one aircraft piloting component, and the downstream units of the computers giving control instructions to at least one aircraft actuator.

11. The system according to claim 10, wherein each upstream unit of a computer is connected to the downstream units of the other computers.

12. Computer program product comprising code instructions to execute a method for verification the integrity of data transmission between a main upstream unit and a main downstream unit, wherein the method comprises implementing the steps of:
(a) Generation, by a data processing module of the main upstream unit, of a first frame comprising a data packet to be transmitted and a cyclic redundancy code of said packet, and transmission to an interface module of the main upstream unit;
(b) Encapsulation, by said interface module of the main upstream unit, of the first frame in a second frame also including a cyclic redundancy code of the first frame;
(c) Transmission of the second frame to interface modules of the main downstream unit and of at least one auxiliary upstream unit;
(d) Extraction of the first frame from the second frame by the interface modules of the main downstream unit and of the at least one auxiliary upstream unit; and transmission to data processing modules of the main downstream unit and of the at least one auxiliary upstream unit;
(e) Extraction of the packet from the first frame by the data processing module of the main downstream unit; and extraction of the cyclic redundancy code of packet by the data processing module of the at least one auxiliary upstream unit;
(f) Encapsulation, by said interface module of the main upstream unit, of the cyclic redundancy code of packet in a third frame;
(g) Transmission of the third frame to the interface module of the at least one auxiliary upstream unit;
(h) Extraction of the cyclic redundancy code of packet from the third frame by the interface module of the at least one auxiliary upstream unit; and transmission to the data processing module of the at least one auxiliary upstream unit;
(i) Comparison by the data processing module of the at least one auxiliary upstream unit of each of the cyclic redundancy codes extracted from the first frame and from the third frame; and confirmation of the integrity of data transmission to the main downstream unit only if comparison is positive.

13. Storage means readable by computer equipment in which a computer program product comprises code instructions to execute a method for verifying the integrity of data transmission between a main upstream unit and main downstream unit, wherein the method implements the steps of:
(a) Generation, b a data processing module of the main upstream unit, of a first frame comprising a data packet to be transmitted and a cyclic redundancy code of said packet, and transmission to an interface module of the main upstream unit;
(b) Encapsulation, by said interface module of the main upstream unit, of the first frame in a second frame also including a cyclic redundancy code of the first frame;
(c) Transmission of the second frame to interface modules of the main downstream unit and of at least one auxiliary upstream unit;
(d) Extraction of the first frame from the second frame by the interface modules of the main downstream unit and of the at least one auxiliary upstream unit; and transmission to data processing modules of the main downstream unit and of the at least one auxiliary upstream unit;

(e) Extraction of the packet from the first frame by the data processing module of the main downstream unit; and extraction of the cyclic redundancy code of packet by the data processing module of the at least one auxiliary upstream unit;

(f) Encapsulation, by said interface module of the main upstream unit, of the cyclic redundancy code of packet in a third frame;

(g) Transmission of the third frame to the interface module of the at least one auxiliary upstream unit;

(h) Extraction of the cyclic redundancy code of packet from the third frame by the interface module of the at least one auxiliary upstream unit; and transmission to the data processing module of the at least one auxiliary upstream unit;

(i) Comparison by the data processing module of the at least one auxiliary upstream unit of each of the cyclic redundancy codes extracted from the first frame and from the third frame; and confirmation of the integrity of data transmission to the main downstream unit only if comparison is positive.

* * * * *